United States Patent [19]

Lewis

[11] Patent Number: 4,556,427

[45] Date of Patent: Dec. 3, 1985

[54] USE OF HUMATES IN PRINTING INKS

[75] Inventor: Harry D. Lewis, Jacksonville, Fla.

[73] Assignee: Union Camp Corporation, Wayne, N.J.

[21] Appl. No.: 560,534

[22] Filed: Dec. 12, 1983

[51] Int. Cl.$^4$ ............................................. C09D 11/02
[52] U.S. Cl. ...................................... 106/20; 106/27; 106/32
[58] Field of Search .............................. 106/20, 27, 32

[56] References Cited

U.S. PATENT DOCUMENTS 3,379,650  4/1968  Beasley et al. ...................... 106/32
4,402,262  9/1983  Handforth ............................ 106/20

Primary Examiner—Lorenzo B. Hayes
Assistant Examiner—Amelia B. Yarbrough
Attorney, Agent, or Firm—Kane, Dalsimer, Kane, Sullivan and Kurucz

[57] ABSTRACT

Stabilized, aqueous dispersions of humate are disclosed as printing inks. Humate is disclosed as a compatible and functional component in all printing ink formulations.

10 Claims, No Drawings

USE OF HUMATES IN PRINTING INKS

BACKGROUND OF THE INVENTION

1. Field of the Invention

The invention relates to humate and its use in printing ink and coating compositions. More particularly, the invention relates to the use of humate compositions as components of printing and colorant coating compositions.

2. Brief Description of the Prior Art

A wide variety of organic and inorganic materials have been used over the centuries as components of printing and coating compositions.

For example, humic acids have been suggested as useful pigments in printing and compositure; see for example Steelink, Proceedings of the California Assoc. of Chemistry Teachers, Journal Chem. Ed. Vol. 40, No. 7, July 1963, pg. 379.

The term "humic acid" has been widely applied to acidic solids obtained from plant decompositions. More recently, humic acids have been regarded as the intermediate product or products which result in the conversion of lignin and other plant materials to hard coal. It is believed that in the decomposition of vegetable matter, the portion of the cell wall material consisting largely of lignin is converted into humus. In time, the humus may be converted progressively to peat, brown coal, bituminous coal and finally into anthracite. More usually, "humic substance" is applied as a generic term for the organic acids derived from humus or the top layer of the soil, containing organic decomposition products of vegetation and animal organisms in admixture with inorganic compounds, sand, minerals, metal hydroxide bases etc. The chemical structure of the humic acids has not been established, but they are believed to be large condensed ring, polymer-like molecules containing pendant carboxylic and phenolic groups. Depending on their solubilities, humic substances are usually classified as humic acid, fulvic acid, hymatomelanic acid or humin.

The term "humate" as used throughout the specification and claims refers to the product of decayed plant and animal material (humus). The preferred humate employed in the method and compositions of the invention are generally derivatives by the natural flocculation or precipitation in sand deposits, of humic substances that were derived from natural humus found in association with earth sources. A most preferred source of humate is one derived from humic substances found in association with titanium mineral deposits.

In spite of the multitude of materials known to be useful as ingredients of printing inks and coating compositions, there has been a search for new materials, especially those suitable for aqueous inks, etc. We have discovered that humate has certain advantages, when used as an ingredient in ink and coating compositions. Humates dispersed in water may be used as a printing ink to transfer an image onto cellulosic substrates. The humates may be dispersed in water and transferred to paper in much the same way as carbon black is dispersed in mineral oil to produce a letterpress news ink.

Humates are relatively inexpensive and readily available. Other advantages associated with their use in ink and coating compositions will be described more fully hereinafter.

SUMMARY OF THE INVENTION

The invention comprises a printing ink composition, which comprises; an aqueous dispersion of humate, stabilized by adjustment of the pH to a neutral or slightly alkaline state (circa 7.0–10.0; preferably 7.0–9.0).

The invention also comprises a coloring composition, which comprises; an aqueous dispersion of a monovalent alkali metal or ammonium humate. The invention also comprises, in a colorant composition which comprises a pigment and a carrier, the improvement which comprises; a monovalent alkali metal or ammonium humate replacing all or part of the pigment.

The compositions of the invention may be used as the coloring source in an ink or like vehicle, obviating the need for binders in some instances. The compositions are, in one embodiment, aqueous dispersions and thereby obviate the need for organic solvents and/or hydrocarbon oils as carrier vehicles.

As colorants, the compositions of the invention have a high affinity for cellulosic substrates. After drying on such substrates, the dried colorant resists removal by rubbing or by application of water or organic solvents. The colorant compositions of the invention also possess diffusion properties which limit its penetration into paper, thereby creating sharp and distinct images on paper.

Humate may be utilized as a component of printing inks that are commercially utilized in offset, letterpress, flexographic, and gravure printing. In all cases, humate is shown to have compatibility with each type of ink system. The utilization in all categories of printing ink is considered to be a non-expected use for the material. In some cases, humate can be utilized for its color value (to create a brown-color ink or to generate a flat-black ink). In other cases, humate can aid in the dispersion of the pigment (such as letterpress news inks). Also, humate may be used as a filler for the ink in much the same way as clays are presently utilized.

DETAILED DESCRIPTION OF THE PREFERRED EMBODIMENTS OF THE INVENTION

The term "humate" as used throughout the specification and claims refers to the product of decayed plant and animal material (humus). The preferred humate employed in the method and compositions of the invention are generally derivatives of the natural flocculation or precipitation in sand deposits, of humic substances that were derived from natural humus found in association with earth sources. A most preferred source of humate is one derived from humic substances found in association with titanium mineral deposits. Titanium mineral deposits include for example, ilmenite and rutile sand deposits. Titanium mineral sand deposits are found in several places throughout the world. In the United States, titanium sand deposits are located in Florida, Georgia and South Carolina. Titanium rock deposits may be found in the Adirondack mountains of New York State.

Other naturally occurring humate and humic sources include "leonardite", an oxidized form of lignite found chiefly in South Dakota and in the Menefee formation in northwestern New Mexico.

The humate employed according to the invention may be treated so as to optimize the number of desired cations on the humate molecule, i.e., the monovalent metallic alkali or ammonium cation. Treatment with sodium hydroxide, potassium hydroxide, ammonium hydroxide or the like will affect the desired optimization.

The method of the invention is carried out by first providing the above described humate, separated from its previous association with earth sources. The derived humate is employed in the method of the invention by simple admixture with conventional ink or film coating compositions, as a component thereof.

When humate is dispersed in water by a variety of means, including chemical and/or mechanical action, a stable dispersion is created. This dispersion is in essence a colored coating or ink which can be used for transferring images to various substrates.

When the colored coating or ink is dried, as observed by the evaporation and/or absorption of water into the substrate, a water insensitive image remains on the substrate. This image is also resistant to abrasion and dissolution by organic solvents. The humate composition of the invention may be considered as a coating, staining or dyeing substance for numerous substrates. We have applied the humate compositions of the invention as a stain for wood products. Humate compositions of the invention may be used as a coloring and coating substance, with and without chemical and physical modification, for many imprintable substrates including leather, textile materials, cellulosics such as paper, polymeric resin films such as films of polyolefins, metals and like materials.

The significance of the discovery of the dispersion of humate in aqueous media is that it possesses the properties and characteristics of an ink in terms of application and properties.

However, unlike the majority of printing inks, the carrier of the humate coloring matter may be water. Printing inks are generally composed of pigments, bound in an organic solvent by a resinous material referred to as a binder. Some printing inks, such as those applied to newspaper, are pigments dispersed in oils such as mineral oil. Humate can be dispersed in water to generate the properties of an ink without utilizing organic solvents, oils, or other pigments. By utilizing chemical and/or mechanical means of dispersing humate into water, humate, without chemical modification is an ink or colored coating per se.

The proportion of humate which may be employed in the improved compositions of the invention is generally not critical. In general, when employed principally as a pigment or a colorant, the humate may comprise from 1 to 50 percent by weight of the total ink composition. When employed principally as a binder, the humate may comprise from 1 to 50 percent by weight of the total composition. The humate may be employed in any useful proportion, when used as a filler. Generally a useful proportion is within the range of from 1 to 30 percent by weight of the total ink composition.

The following examples describe the manner and process of making and using the invention and set forth the best mode contemplated by the inventor of carrying out the invention but are not to be construed as limiting.

PREPARATION 1

A quantity of titanium sand deposit was provided, from the Florida Geologic formation. The titanium sands are in a formation commonly referred to as "hardpan". The hardpan comprises titanium sands bound together by a coating of humate. It is humate from these titanium bearing sands which is employed in the present invention.

The desired humate is separated from the titanium sand deposits by first breaking up the deposit formation of hardpan into a ground ore of a convenient size for handling. Much of the humate in the ground ore can be washed off with water to effect the desired separation. Additional humate is obtained by washing the concentrated ore with aqueous sodium hydroxide. The separated humate may then be dried in the sunlight or by artificial means. The average composition of the titanium sand derived humate is as follows:

| COMPOSITION OF TITANIUM SAND HUMATE | | | | | | | |
|---|---|---|---|---|---|---|---|
| Elemental Composition (Dry Basis) (%) | | | | | | Composition, Wt. % | |
| | | | | | "As Is" Moisture | Ash ("As Is") | Ash (Dry Basis) |
| C | H | O | N | S | | | |
| 36.7 | 2.3 | 23.7 | 0.6 | 0.3 | 9.8 | 30.9 | 34.3 |
| Functional Group Contents (Dry Basis) meq/g* | | | | Ratios, Wt./Wt, (Dry Basis) | | | |
| Total Acidity | | Carboxylic Acid | | C:H | | C:O | |
| 6.0 | | 2.1 | | 16.0:1 | | 1.5:1 | |
| Metal Contents (Dry Basis) (%) | | | | | | | |
| AL | | Ti | | Fe | | Ca | |
| 6 | | 1 | | 1 | | 0.1 | |

*Methods for the functional group analysis may be found in M. Schitzer and S. U. Khan, "Humic Substances in the Environment," Marcel Dekker, Inc., New York, New York 1972, pp. 39–41. The barium hydroxide method for total acidity and calciumacetate method for carboxylic acid groups described in the citation were used.

PREPARATION 2

A quantity of titanium sand deposits was provided, from its Florida geological formation at Trail Ridge, Fla.

The humate was separated from the ilmenite deposits in a manner similar to that used in Preparation 1, supra. The following Table shows the elemental composition and metal content of the humate composition separated from the Trail Ridge deposit.

TABLE

| Element | Composition (%) |
|---|---|
| C | 45.21 |
| H | 3.25 |
| O | 23.75 |
| S | 0.30 |
| ash | 23.99 |
| Ti | 0.61 |
| Zr | 0.014 |
| Al | 5.34 |
| Fe | 0.46 |
| Ca | 0.007 |
| C/O ratio | 1.9:1.0 |
| C/H ratio | 13.9:1.0 |

It will be appreciated that the above analysis for humates associated with titanium ore deposits is for specific materials and the compositional make-up may vary somewhat for different materials within the same ore body. In general the preferred humate compositions employed in the method of the invention have compositional make-ups which provide a carbon to hydrogen ratio (weight to weight) of from 9.5–17.5:1.0; a carbon to oxygen ratio of 1.0–2.3:1.0; and aluminum content of 2.8 to 8.4 percent by weight, a titanium content of 0.5 to 3.5 percent by weight and calcium content of less than 0.5 percent by weight.

It will also be appreciated from the above that the humate associated with titanium mineral deposits bears some resemblance in compositional make-up to leonardite, a humate substance. A commercially available leonardite has the following composition:

COMPOSITION OF A LEONARDITE

| Elemental Composition (Dry Basis) (%) | | | | "As Is" Moisture | Composition, Wt. % | |
|---|---|---|---|---|---|---|
| C | H | O | S | | Ash ("As Is") | Ash (Dry Basis) |
| 50.61 | 2.80 | 19.83 | 1.15 | 15.50 | 16.87 | 19.96 |

| Functional Group Contents (Dry Basis) meq/g* | | Ratios, Wt./Wt. | |
|---|---|---|---|
| Total Acidity | Carboxylic Acid | C:H | C:O |
| 5.3 | 1.8 | 18.1:1 | 2.6:1 |

| Metal Contents (Dry Basis) (%) | | | |
|---|---|---|---|
| AL | Ti | Fe | Ca |
| 0.8 | 0.06 | 1.1 | 2.4 |

The commercially available Leonardite may be ammoniated by the method described in U.S. Pat. No. 3,111,404 to provide a preferred humate for use in the method of the invention.

The humate materials of Preparations 1 and 2, described above and the commercially available leonardite may be used in the method and the compositions of the invention as is or after separation of its ash content. The humate-water dispersion is not like the formulations for letterpress newspaper inks. Letterpress newspaper inks generally consist of 12% carbon/black dispersed in 88% mineral oil. This carbon black mineral oil dispersion is by definition a printing ink, although it does not contain a resinous binder to bind the pigment particles into the system. Unlike the known letterpress newspaper inks, the humate-water dispersion of the present invention is an aqueous composition which is functionally equivalent to the previously known carbon black/mineral oil formulation.

EXAMPLE 1

A humate-water dispersion is created by adding 5 grams of humate from Preparation 1, supra., to 95 grams of water. A stable dispersion is obtained by adding ammonium hydroxide to the dispersion dropwise until a pH of approximately 7.5 to 8.0 is obtained. This dispersion is printed on Kraft (bleached) paper with a flexographic hand proofer. The print is light brown in appearance and is printed (transferred from roller to paper) acceptably. When the print is dry (approximately 5 minutes at ambient conditions), the printed surface is non-washable with water. This example shows that humate can be utilized as a printing ink material and will transfer an image from a water dispersion form onto paper.

EXAMPLE 2

Evaluation of humate in a quickset ink vehicle for offset printing:

| (a) ink vehicle formulation: | |
|---|---|
| alcohol insoluble maleic rosin resin (Union Camp's UNI-REZ 7100) | 30 Grams |
| modified phenolic rosin resin (Union Camp's UNI-REZ 9022) | 90 Grams |
| isophthalic alkyd resin (ISOREZ #7)* | 45 Grams |
| alkali refined linseed oil | 45 Grams |
| high boiling oil (Magie 535)** | 60 Grams |

-continued

| | 270 grams |
|---|---|

| | STANDARD INK | HUMATE INK |
|---|---|---|
| (b) ink formulation: | | |
| vehicle | 59.0 gms. | 59.0 gms. |
| carbon black | 18.0 gms. | 9.0 gms. |
| humate (Prep. 1, Supra) | — | 9.0 gms. |
| polyethylene wax | 1.5 gms. | 1.5 gms. |
| ink oil (Magie 535 Supra) | 3.0 gms. | 1.0 gms. |
| 12% cobalt drier | 1.0 gms. | 1.0 gms. |
| 12% zirconium drier | 0.5 gms. | 0.5 gms. |
| | 83.0 gms. | 81.0 gms. |

*Degen Oil & Chem. Co.; Jersey City, New Jersey
**Magie Bros. Oil Co.; Franklin Park, Illinois (c) The "standard" and the "humate" ink were prepared according to the formulations presented above. They were dispersed via three passes on a three roll mill to achieve an ink of acceptable fluidity and dispersion. They were printed onto paper via a Pantone Gallus Printing Press. Humate showed comparable ink transfer properties as compared to the standard ink formulation. Ink characteristics such as grind, tack, coating, and drying were noted to be the same for both inks.

EXAMPLE 3

Evaluation of humate in a heatset ink vehicle for offset printing:

| (a) ink vehicle formulation: | |
|---|---|
| petroleum hydrocarbon resin (Nevros 1420)* | 90 gms. |
| modified phenolic rosin resin (Union Camp's UNI-REZ 9014) | 45 gms. |
| isophthalic alkyd resin (ISOREZ #7 Supra) | 54 gms. |
| ink oil (Magie Sol M047)** | 104.5 gms. |
| gelling agent (AIE-M)*** | 1.5 gms. |

*Neville Chemical Co.; Pittsburgh, Pennsylvania
**Magie Bros. Oil Co.; Franklin Park, Illinois
***Chatten Chemicals; Chattanooga, Tennessee

| | STANDARD INK | HUMATE INK |
|---|---|---|
| (b) ink formulation: | | |
| vehicle | 65.0 gms. | 65.0 gms. |
| carbon Black | 16.0 gms. | 8.0 gms. |
| humate (Prep. 1, Supra) | — | 8.0 gms. |
| polyethylene wax | 2.0 gms. | 2.0 gms. |
| Teflon wax (SST-3)* | 0.5 gms. | 0.5 gms. |
| alkali refined linseed oil | 5.0 gms. | — |
| ink oil (Magiesol 47) | 12.0 gms. | 9.5 gms. |

*Shamrock Chemicals Corp.; Newark, New Jersey

The humate ink shows comparable ink transfer properties to the standard ink formulation. Less ink oil and no linseed oil was required in the humate ink formulation as compared to the standard ink formulation to generate the same ink flow properties.

EXAMPLE 4

Evaluation of humate in web offset news inks:

| | STANDARD INK | HUMATE INK |
|---|---|---|
| (a) formulation: | | |
| hydrocarbon resin (Nevchem 140) | 52.8 gms. | 52.8 gms. |
| mineral seal oil (Mentor 28)* | 53.7 gms. | 52.2 gms. |
| carbon black | 12.0 gms. | 6.0 gms. |
| humate (Prep. 1, Supra) | — | 6.0 gms. |

*Exxon Chemical Americas; Houston, Texas

Both inks after milling were printed on the Pantone Gallus Printing Press with newsprint paper stock as the substate. Both inks showed comparable ink transfer properties.

EXAMPLE 5

Evaluation of humate in letterpress news inks:

|  | STANDARD INK | HUMATE INK |
|---|---|---|
| (a) formulation: |  |  |
| mineral oil | 88 gms. | 88 gms. |
| carbon black | 12 gms. | 6 gms. |
| humate (Prep. 1, Supra) | — | 6 gms. |

After dispersion was effected via shot mill shaking for thirty minutes, both inks were coated on newsprint paper via a 0.4 mil wedgeplate. Humate ink and the standard ink showed comparable ink transfer properties. The humate dispersion is noted to be much lower in viscosity than the standard ink system, indicating that humate has improved mineral oil compatibility versus carbon black.

EXAMPLE 6

Evaluation of humate in solvent, flexographic inks:

|  | Black Ink "A" | Clay Ink "B" | Humate Ink "C" |
|---|---|---|---|
| (a) formulations: |  |  |  |
| varnish (alcohol soluble maleic rosin resin UNIREZ 757) | 68.8 gms. | 68.8 gms. | 68.8 gms. |
| carbon black pigment | 30.0 gms. | 23.0 gms. | 23.0 gms. |
| ASP-600 Clay | —gms. | 7.0 gms. | —gms. |
| humate (Prep. 1, supra) | — | — | 7.0 gms. |
| anti-foam | 0.2 gms. | 0.2 gms. | 0.2 gms. |
| wax | 1.0 gms. | 1.0 gms. | 1.0 gms. |
| solvent (ethanol) | 70.0 gms. | 70.0 gms. | 70.0 gms. |

All three inks could be coated on newsprint paper stock via a Rubber hand roller. All three inks showed comparable ink transfer. The humate ink has the same color development as the straight black ink, and both of these inks show better color development than the clay ink.

EXAMPLE 7

Evaluation of humate in water-based, flexographic inks:

|  | Black Ink "D" | Clay Ink "E" | Humate Ink "F" |
|---|---|---|---|
| (a) formulations: |  |  |  |
| varnish (UNI-REZ 7057) | 68.8 gms. | 68.8 gms. | 68.8 gms. |
| carbon black pigment | 30.0 gms. | 23.0 gms. | 23.0 gms. |
| ASP-600 Clay | — | 7.0 gms. | — |
| humate (Prep. 1, supra) | — | — | 7.0 gms. |
| anti-foam | 0.2 gms. | 0.2 gms. | 0.2 gms. |
| wax | 1.0 gms. | 1.0 gms. | 1.0 gms. |
| water | 70.0 gms. | 70.0 gms. | 70.0 gms. |

The humate ink "F" has the same color development as the standard black ink "D" when coated.

EXAMPLE 8

Evaluation of humate in publication gravure inks:

(a) Humate was used to replace clay in a standard black ink for printing uncoated paper stock. The test formulas are as follows:

|  | STANDARD- WEIGHT % | HUMATE MODIFIED WEIGHT % |
|---|---|---|
| Base Grind |  |  |
| carbon black | 18 | 18 |
| ASP-600 Clay | 14.6 | — |
| humate (Prep. 1, supra) | — | 14.6 |
| rosin resinate varnish (UNI-REZ 1061) | 43.4 | 43.4 |
| toluene | 24.0 | 24.0 |
|  | 100.0 | 100.0 |

These bases are dispersed in a Jiffy Mill (steel shot in container placed on paint shaker) for thirty minutes. They are "let down" to form a finished ink as follows:

LET DOWN INK

|  | WEIGHT % |
|---|---|
| base grind | 44.5 |
| UNI-REZ 1061 varnish | 31.3 |
| solvent (toluene) | 24.2 |
|  | 100.0 |

Drawdowns of the inks shows the humate modified ink offers more color development than the standard ink but with a slight loss in gloss. The inks were also evaluated for abrasiveness. The standard GRI Abrasion Test procedure was followed. The humate ink was less abrasive than the clay standard after 400 cycles. The examples given above show that humate can be utilized as a component of all the major types of printing ink. In all cases, a spray-dried form of humate was utilized in the formulations to show that (a) it was compatible with other ink components (b) it would produce an ink with normal tack properties and behavior (c) It could be printed on paper stock by the process normally employed for that given ink type.

As mentioned above, printing inks that are commercially used on presses, are compositions of pigment (coloring matter), binder (resinous material which holds or "binds" the pigment), and a carrier (solvent, oil, or water). The printing inks used are similar to paints in that they possess the quality referred to as film formation. It was our intent to show that humate could be utilized in such printing ink compositions where film formation properties are desirable. Humate has been shown to be compatible with all four of the major printing ink types of compositions that are used commercially; namely, letterpress, quickset and heatset offset, flexographic, and gravure printing inks. The methods of applying these inks and the apparatus employed are so well known that details need not be recited herein; see for example the Kirk-Othmer Encyclopedia of Chem. Technology, Vol. 16, pages 494–546.

EXAMPLES 9–16

Each of the Examples 1–8, supra., is repeated except that the humate of Preparation 1 supra., as used therein is replaced with equal proportions of the humate of Preparation 2, supra. The results obtained are substantially the same as obtained in the corresponding Examples 1–8.

EXAMPLES 17-24

Each of the Examples 1-8, supra., is repeated except that the humate of Preparation 1, supra., as used therein is replaced with equal proportions of an ammoniated commercial leonardite as described above, with good results.

What is claimed:

1. In a printing ink composition which comprises a pigment, a binder and a carrier, the improvement which comprises; the presence of a humate selected from the group consisting of monovalent alkali metal humates and ammonium humate in an aqueous dispersion stabilized by adjustment of the pH to a neutral or slightly alkaline state.

2. The composition of claim 1 wherein the dispersion is stabilized with ammonium hydroxide.

3. The improved composition of claim 1 wherein the humate has a compositional make-up which provides a carbon to hydrogen ratio (weight to weight) of from 9.5-17.5:1.0; a carbon to oxygen ratio of 1.0-2.3:1.0; an aluminum content of 2.8 to 8.4 percent by weight, a titanium content of 0.5 to 3.5 percent by weight and a calcium content of less than 0.5 percent by weight.

4. In an ink for offset printing which comprises a resin binder and oil vehicle in admixture with a pigment, the improvement which comprises, the replacement of all or part of the pigment component with a humate separated from earth sources.

5. The improved ink of claim 4 wherein the humate comprises an aqueous dispersion of said humate stabilized by adjustment of the pH to the neutral or slightly alkaline state.

6. The improved ink of claim 5 which includes a dryer.

7. In a letterpress news ink which comprises a pigment dispersed in an oil vehicle, the improvement which comprises replacement of all or part of the pigment with a humate separated from earth sources.

8. In a flexographic ink which comprises a resin binder in a solvent, a pigment, and a clay filler, the improvement which comprises; replacing all or part of the clay component with a humate separated from earth sources.

9. In a gravure printing ink which comprises a pigment, a clay filler, a resin binder and an organic solvent for the binder, the improvement which comprises replacement of all or part of the clay with a humate separated from earth sources.

10. A method of applying indicia to an imprintable substrate, which comprises;

providing a colorant composition which comprises an aqueous dispersion of a humate, selected from the group consisting of monovalent alkali metal humates and ammonium humate said dispersion being stabilized by adjustment to a pH of neutral to slightly alkaline;

applying the colorant composition to an indicia printing type; and transferring the composition from the type to an imprintable substrate.

* * * * *